(12) United States Patent
Sawada

(10) Patent No.: US 11,465,058 B2
(45) Date of Patent: Oct. 11, 2022

(54) GAME PROGRAM AND GAME SYSTEM

(71) Applicant: SQUARE ENIX CO., LTD., Tokyo (JP)

(72) Inventor: Yui Sawada, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 189 days.

(21) Appl. No.: 16/941,338

(22) Filed: Jul. 28, 2020

(65) Prior Publication Data

US 2021/0031114 A1 Feb. 4, 2021

(30) Foreign Application Priority Data

Jul. 30, 2019 (JP) .............................. JP2019-139305

(51) Int. Cl.
*A63F 13/837* (2014.01)
*A63F 13/46* (2014.01)
*A63F 13/537* (2014.01)

(52) U.S. Cl.
CPC ............ *A63F 13/837* (2014.09); *A63F 13/46* (2014.09); *A63F 13/537* (2014.09)

(58) Field of Classification Search
CPC ...... A63F 13/837; A63F 13/46; A63F 13/537; A63F 2300/8076; A63F 13/42; A63F 13/426; A63F 13/5255; A63F 13/5258; A63F 2300/306
See application file for complete search history.

(56) References Cited

U.S. PATENT DOCUMENTS

2005/0186999 A1* 8/2005 Melgosa ............ G09B 19/0038
463/2

FOREIGN PATENT DOCUMENTS

| JP | 2003245465 A | 9/2003 |
|----|---|---|
| JP | 2007185359 A | 7/2007 |
| JP | 2014117490 A | 6/2014 |

OTHER PUBLICATIONS

Experience the smartphone version of "Everybody's Golf" "Mingol"—Feeling great to Nice shot with one hand, [Online]CNET, Jun. 2, 2017, [Searched on Jul. 22, 2020], URL, https://japan.cnet.com/articles/35102187 (text indicating well-known technology).
Office Action from Japan Patent Office (JPO) in Japanese Patent Appl. No. 2019-139305, dated Aug. 25, 2020.

* cited by examiner

*Primary Examiner* — William H McCulloch, Jr.
*Assistant Examiner* — Ankit B Doshi
(74) *Attorney, Agent, or Firm* — Dorsey & Whitney LLP

(57) ABSTRACT

A game program causing a computer to execute a function of controlling progress of a video game based on an operation input of a user causes the computer to implement a first control function of controlling operation of a first reference object having a predetermined shape and an enlarging and reducing object that is repeatedly enlarged and reduced between a state of being contained in the first reference object and a state of containing the first reference object, a second control function of displaying a game image that is an image of a game space including the first reference object and the enlarging and reducing object on a display unit, and a decision function of deciding an arrival location of a moving object released from a predetermined position in the game space based on a state of the enlarging and reducing object if a decision operation is performed.

9 Claims, 14 Drawing Sheets

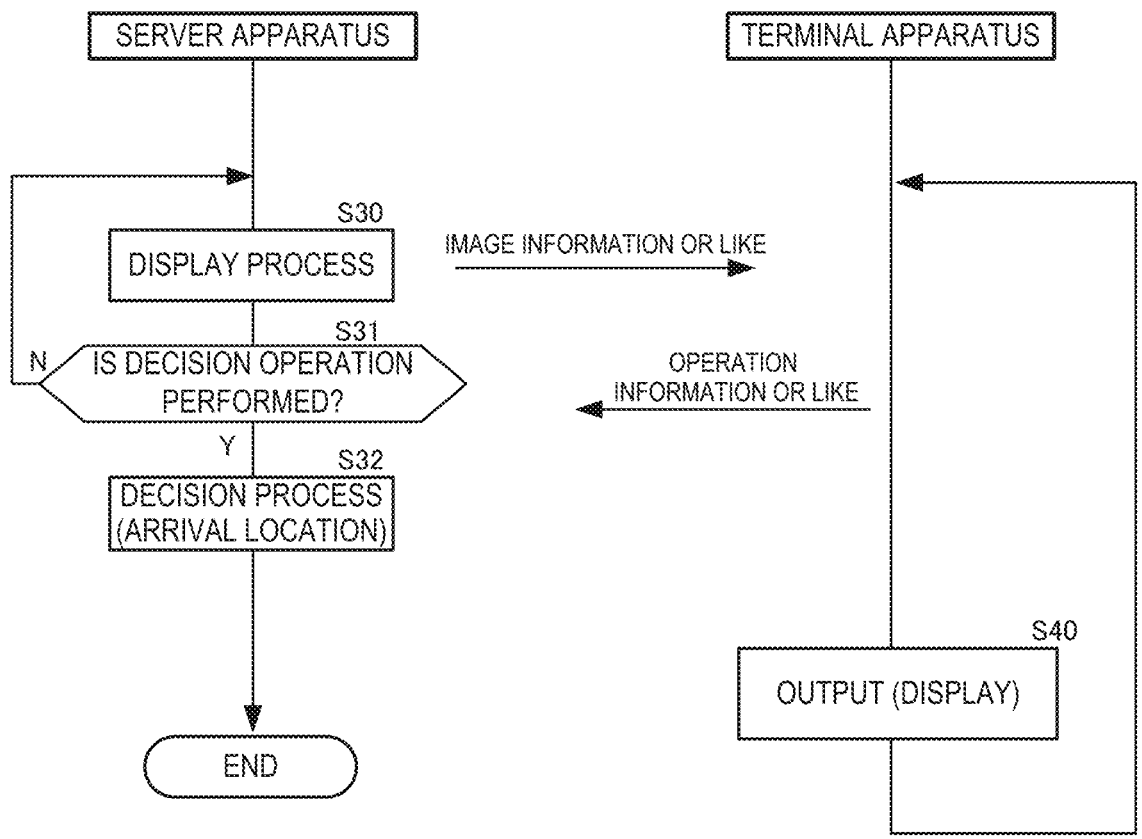

GAME PROGRAM AND GAME SYSTEM

CROSS-REFERENCE TO RELATED APPLICATION

This application is based upon and claims the benefit of priority of the prior Japanese Patent Application No. JP 2019-139305, filed on Jul. 30, 2019, the entire contents of which is incorporated herein by reference in its entirety for any purpose.

BACKGROUND OF THE INVENTION

Field of the Invention

The invention relates to a game program and a game system.

Description of Related Art

A video game in which attack is performed on a target such as an enemy character by shooting a bullet from a gun in a three-dimensional virtual space has been provided. Examples of such game media, systems, devices and methods may be found in Japanese Published Patent Application No. JP-2003-245465. In such a game, the bullet hits the target by shooting the bullet in a state where an aiming cursor is set to the target. Accordingly, a user easily aims at the target.

SUMMARY

In the above game in which the aiming cursor or the like for setting aim is used, the bullet or the like basically hits the target in a case where the aiming cursor is set to the target. Thus, there may be a lack of interest as a game.

An object of at least one embodiment of the present invention is to solve deficiencies of the related technology.

From a non-limiting viewpoint, a game program according to one embodiment of the present invention is a game program causing a computer to implement a function of controlling progress of a video game based on an operation input of a user. The game program causes the computer to implement a first control function of controlling operation of a first reference object having a predetermined shape and an enlarging and reducing object that is repeatedly enlarged and reduced between a state of being contained in the first reference object and a state of containing the first reference object, a second control function of displaying a game image that is an image of a game space including the first reference object and the enlarging and reducing object on a display unit, and a decision function of deciding an arrival location of a moving object released from a predetermined position in the game space based on a state of the enlarging and reducing object in a case where a decision operation is performed by the user, in which in the decision function, a function of deciding, as the arrival location, a position in the game space included in a display region of the first reference object in the game image in a case where the enlarging and reducing object is in the state of being contained in the first reference object is implemented.

From a non-limiting viewpoint, a game program according to one embodiment of the present invention is a game program causing a server apparatus to control progress of a video game. The server apparatus is connected to a game terminal apparatus executing the video game based on an operation input of a user through a communication network. The game program causes the server apparatus to implement a first control function of controlling operation of a first reference object having a predetermined shape and an enlarging and reducing object that is repeatedly enlarged and reduced between a state of being contained in the first reference object and a state of containing the first reference object, a second control function of displaying a game image that is an image of a game space including the first reference object and the enlarging and reducing object on a display unit, and a decision function of deciding an arrival location of a moving object released from a predetermined position in the game space based on a state of the enlarging and reducing object in a case where a decision operation is performed by the user, in which in the decision function, a function of deciding, as the arrival location, a position in the game space included in a display region of the first reference object in the game image in a case where the enlarging and reducing object is in the state of being contained in the first reference object is implemented.

From a non-limiting viewpoint, a game system according to one embodiment of the present invention is a game system including a game terminal apparatus executing a video game based on an operation input of a user, and a server apparatus connected to the game terminal apparatus through a communication network. The game system includes a first controller configured to control operation of a first reference object having a predetermined shape and an enlarging and reducing object that is repeatedly enlarged and reduced between a state of being contained in the first reference object and a state of containing the first reference object, a second controller configured to display a game image that is an image of a game space including the first reference object and the enlarging and reducing object on a display unit, and a decider configured to decide an arrival location of a moving object released from a predetermined position in the game space based on a state of the enlarging and reducing object in a case where a decision operation is performed by the user, in which the decider decides, as the arrival location, a position in the game space included in a display region of the first reference object in the game image in a case where the enlarging and reducing object is in the state of being contained in the first reference object.

One or two or more deficiencies are solved by each embodiment of the present application.

BRIEF DESCRIPTION OF THE DRAWINGS

FIG. 4 is a flowchart illustrating an example of operation of a server apparatus and a terminal apparatus corresponding to at least one embodiment of the present invention in a case where the server apparatus executes the location decision process.

DESCRIPTION OF EMBODIMENTS

Hereinafter, examples of embodiments of the present invention will be described with reference to the drawings. Various constituents in the example of each embodiment described below can be appropriately combined without causing contradiction or the like. In addition, contents described as an example of a certain embodiment may not be described in another embodiment. In addition, contents of operations and processes not related to a characteristic part of each embodiment may be omitted. Furthermore, the order of various processes constituting various flows described below may be a random order without causing contradiction or the like in processing contents.

First Embodiment

Figure 1:
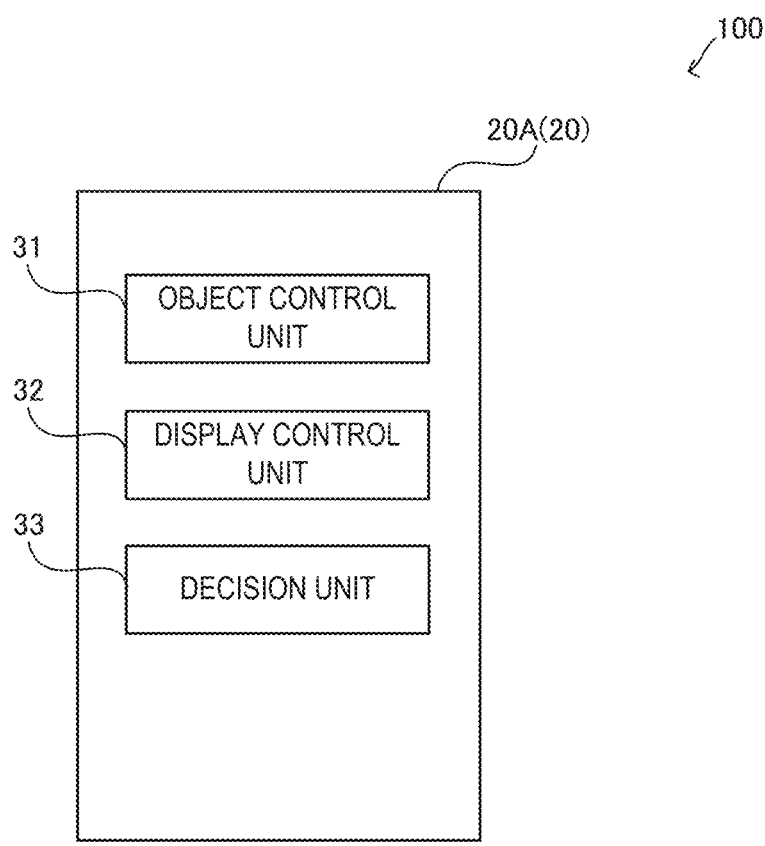
FIG. 1 is a block diagram illustrating an example of a configuration of a game system corresponding to at least one embodiment of the present invention.

FIG. 1 is a block diagram illustrating an example of a configuration of a game system 100 corresponding to at least one embodiment of the present invention. As illustrated in FIG. 1, the game system 100 includes a single terminal apparatus (game terminal apparatus) 20 that is a computer used by a user (player). In FIG. 1, a configuration of a terminal apparatus 20A that is an example of a configuration of the terminal apparatus 20 is illustrated. The configuration of the game system 100 is not limited to the above configuration. For example, a configuration (refer to FIG. 3) in which the terminal apparatus of the user is connected to a server apparatus (video game processing server) through a communication network and a service of a video game is provided to the terminal apparatus from the server apparatus may be available.

The video game processing system 100 has various functions for executing the video game (game) that progresses based on an operation input of the user. In the game of the example of the present embodiment, a moving object is released (shot) from a predetermined position in a game space. Any object that is a moving body moving in the game space can be employed as the moving object. For example, a dart of a darts game, a ball, a bullet of a gun, or a missile corresponds to the moving object. In the case of the dart of the darts game, for example, the predetermined position from which the moving object is released may be a position corresponding to a hand of a player character of the user.

The user may perform an operation of releasing the moving object by referring to a first reference object and an enlarging and reducing object displayed on a display unit. That is, the first reference object and the enlarging and reducing object are objects used as an aiming cursor for setting aim.

The first reference object has a predetermined shape such as an annular shape (ring shape). The enlarging and reducing object has a shape similar to, for example, the first reference object. The enlarging and reducing object is repeatedly enlarged and reduced between a state of being contained in the first reference object and a state of containing the first reference object. The state of being contained in the first reference object is a state where the enlarging and reducing object is included in the first reference object in a game image. For example, in such a state, the enlarging and reducing object is smaller than the first reference object and overlaps with the first reference object in the game image.

The state of containing the first reference object is a state where the enlarging and reducing object includes the first reference object in the game image. For example, in such a state, the enlarging and reducing object is larger than the first reference object and overlaps with the first reference object in the game image.

In the case of a state where the enlarging and reducing object has the same shape as the first reference object and overlaps with the first reference object in the game image, any one of the state of being contained in the first reference object or the state of containing the first reference object may be set. Alternatively, setting that does not correspond to any of the states may be performed.

An arrival location of the released moving object is decided based on the state of the enlarging and reducing object. Specifically, in a case where a decision operation is performed by the user in a state where the enlarging and reducing object is contained in the first reference object, a position in the game space included in a display region of the first reference object in the game image is decided as the arrival location. That is, a position that overlaps with the first reference object in the game space is decided as the arrival location. The position in the game space included in the display region of the first reference object is specified using a general configuration. Thus, such a configuration will not be described in detail.

In a case where the decision operation is performed by the user in a state where the enlarging and reducing object contains the first reference object, for example, a position in the game space in a peripheral region of the first reference object in the game image may be set as the arrival location. Alternatively, the moving object may not be released as a release failure. Accordingly, depending on the timing of the decision operation, the user may not hit the target even in a case where aim is appropriately set to the target.

The terminal apparatus 20 is managed by the user playing the game. The terminal apparatus 20 is configured with a terminal apparatus such as a stationary game apparatus, a personal computer, a mobile phone terminal or personal digital assistants (PDA), or a portable game apparatus that can execute the video game.

The terminal apparatus 20 includes an operation unit, a storage unit such as a hard disk drive, a control unit that is configured with a CPU or the like and generates a game image by executing the game, the display unit displaying the game image, and the like for executing the video game. Such units are general configurations and thus, will not be described in detail. In the terminal apparatus 20, software (game program) for executing the video game and controlling the progress of the game is stored in the storage unit. The game program includes game data.

Next, the configuration of the terminal apparatus 20A which is an example of the configuration of the terminal apparatus 20 will be described. The terminal apparatus 20A includes at least an object control unit 31, a display control unit 32, and a decision unit 33 for the control unit to control the progress of the video game by executing the game program stored in the storage unit.

The object control unit (first control function) 31 controls the operation of the first reference object and the enlarging and reducing object. For example, arrangement positions of the first reference object and the enlarging and reducing object are controlled. In addition, for example, an operation of enlarging and reducing the enlarging and reducing object is controlled. The display control unit (second control function) 32 displays the game image of the game space including the first reference object and the enlarging and reducing object on the display unit. Image data of the first reference object, the enlarging and reducing object, and the like may be included in the game data.

The decision unit 33, in a case where the decision operation is performed by the user, decides the arrival location of the moving object released from the predetermined position in the game space based on the state of the enlarging and reducing object. In the case of a state where the enlarging and reducing object is contained in the first reference object, the decision unit 33 decides a position in the game space included in the display region of the first reference object in the game image as the arrival location.

Next, the operation of the game system 100 (system 100) of this embodiment will be described.

Figure 2:
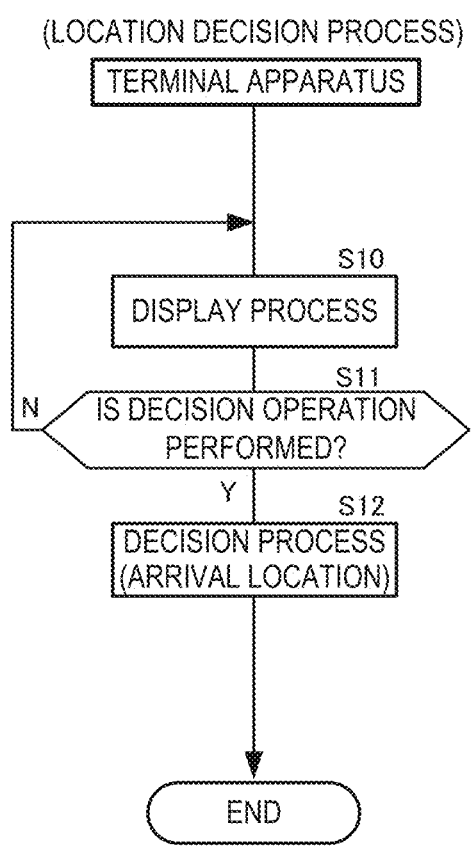
FIG. 2 is a flowchart illustrating an example of a location decision process corresponding to at least one embodiment of the present invention.

FIG. 2 is a flowchart illustrating an example of a location decision process executed by the system 100. In the location decision process, a process for deciding the arrival location of the moving object is performed. Hereinafter, a case where the terminal apparatus 20A executes the location decision process will be illustratively described.

For example, the location decision process of the example of the present embodiment is executed by using a state where the moving object can be shot by an operation of the user as a trigger.

In the location decision process, the terminal apparatus 20A performs a display process (step S10). In the display process, the game image of the game space including the first reference object and the enlarging and reducing object is displayed on the display unit. The terminal apparatus 20A repeatedly executes the display process in step S10 until the decision operation is performed (step S11: YES). That is, an operation of repeatedly enlarging and reducing the enlarging and reducing object as described above is displayed on the display unit until the decision operation is performed. The decision operation may be performed by operating the operation unit.

In a case where the decision operation is performed (step S11: YES), the terminal apparatus 20A executes a decision process (step S12). In the decision process, as described above, the arrival location is decided based on the state of the enlarging and reducing object in a case where the decision operation is performed. Then, the terminal apparatus 20A finishes the location decision process. Finally, the terminal apparatus 20A performs a process of releasing the moving object toward the decided arrival location.

As one aspect of the first embodiment described above, the terminal apparatus 20A is configured to include the object control unit 31, the display control unit 32, and the decision unit 33. Thus, depending on the timing of the decision operation, the user may not hit a part at which the moving object is aimed even in a case where aim is appropriately set. Accordingly, the user needs to consider the timing of the decision operation in order for the moving object to hit, and interest as a game is improved.

Figure 3:
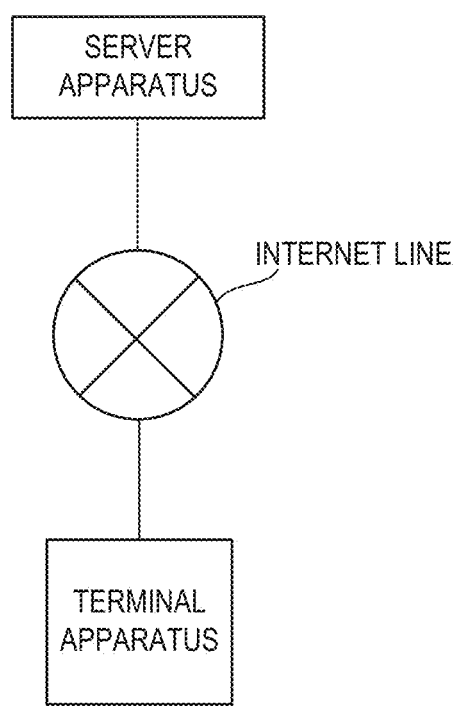
FIG. 3 is a block diagram illustrating an example of the configuration of the game system corresponding to at least one embodiment of the present invention.

In the example of the first embodiment, the terminal apparatus 20A controls the progress of the game by executing the game program. However, the present invention is not particularly limited to the example. For example, as illustrated in FIG. 3, a configuration in which a game system includes a server apparatus and a terminal apparatus and the server apparatus includes at least the object control unit 31, the display control unit 32, and the decision unit 33 instead of the terminal apparatus 20A may be available.

The server apparatus includes a storage unit such as a hard disk drive, a control unit configured with a CPU or the like, and the like, not illustrated. The server apparatus controls the progress of the video game in the same manner as the terminal apparatus 20A by causing the control unit to execute the game program stored in the storage unit. The server apparatus has general configurations such as the control unit and a communication unit for controlling the progress of the video game. Such configurations will not be described in detail.

The server apparatus does not execute the video game in the same manner as the terminal apparatus 20A. For example, the server apparatus includes the communication unit connected to an Internet line (communication network) and communicates with the terminal apparatus executing the video game. The server apparatus receives an operation signal (operation information) from the user (terminal apparatus) and transmits information (image information or the like) related to the progress of the game to the terminal apparatus. A plurality of server apparatuses may cooperate to execute the game program, or the server apparatus and the terminal apparatus may cooperate to execute the game program (control the progress of the game).

FIG. 4 is a flowchart illustrating an example of operation of the server apparatus and the terminal apparatus in a case where the server apparatus executes the location decision process illustrated in FIG. 2. The server apparatus periodically receives the operation input (operation information) or the like with respect to the operation unit from the terminal apparatus.

In the location decision process, the server apparatus performs the display process (step S30). In the display process, for example, the image information or the like for generating the game image of the game space including the first reference object and the enlarging and reducing object is transmitted to the terminal apparatus. The terminal apparatus outputs (displays on the display unit) the game image based on the received image information (step S40).

The server apparatus repeatedly executes the display process in step S30 until the decision operation is performed (step S31: YES). That is, an operation of repeatedly enlarging and reducing the enlarging and reducing object as described above is displayed until the decision operation is performed. For example, the terminal apparatus transmits the operation information about the decision operation performed with respect to the operation unit by the user to the server apparatus. In a case where the server apparatus receives information about the decision operation, the server apparatus determines that the decision operation is performed.

In a case where the decision operation is performed (step S31: YES), the server apparatus executes the decision process (step S32). In the decision process, as described above, the arrival location is decided based on the state of the enlarging and reducing object in a case where the decision operation is performed. Then, the server apparatus finishes the location decision process. Finally, the server apparatus performs a process of releasing the moving object toward the decided arrival location.

Any configuration may be employed as the form (including shape and color) of the first reference object and the enlarging and reducing object. For example, two rings 40 and 41 illustrated in FIG. 5A may be set as the first reference object and the enlarging and reducing object. FIGS. 5A to 5D are diagrams illustrating one example of the first reference object and the enlarging and reducing object. For example, the game image in which the images of the rings 40 and 41 illustrated in FIGS. 5A to 5D are overlaid on an image of a game space 50 that is a three-dimensional virtual space is displayed on the display unit.

The rings 40 and 41 are concentrically arranged. The shape of the ring 40 is not changed, and the ring 41 is enlarged and reduced. That is, the ring 41 is gradually reduced from a state of containing the ring 40 illustrated in FIG. 5A to a state illustrated in FIG. 5B and further to a state of being contained in the ring 40 illustrated in FIG. 5C. Then, the ring 41 is gradually enlarged from the state illustrated in FIG. 5C to the state illustrated in FIG. 5B and further to the state illustrated in FIG. 5A. The ring 41 is repeatedly enlarged and reduced until the decision operation is performed by the user.

Figure 5A:
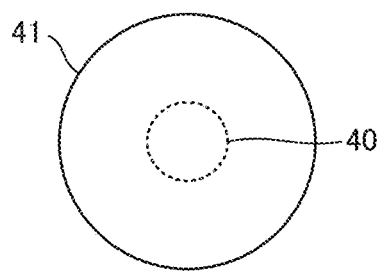
FIGS. 5A to 5D are diagrams illustrating one example of a first reference object and an enlarging and reducing object corresponding to at least one embodiment of the present invention.
Figure 5B:
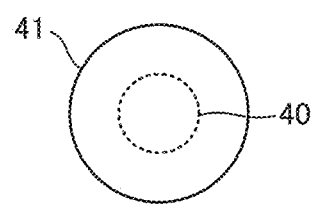
Figure 5C:
Figure 5D:
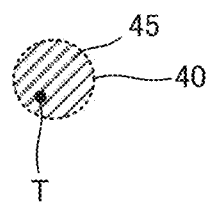

For example, in a case where the decision operation is performed in the state of the ring 41 illustrated in FIG. 5C, a position in the game space included in a display region 45 (arrival region) of the ring 40 illustrated in FIG. 5D is decided as the arrival location. That is, a position in the game space overlapping with the display region 45 in the game image is decided as the arrival location. For example, a position in the game space 50 corresponding to a position T that is randomly decided in the display region 45 may be decided as the arrival location.

The display positions of the first reference object and the enlarging and reducing object on the display unit may not be fixed. For example, the display positions may be movable in a screen (game image) on the display unit. In this case, the first reference object and the enlarging and reducing object may be moved based on an operation (moving operation) performed on the operation unit by the user. By the moving operation, the user can set the first reference object and the enlarging and reducing object to the target. Alternatively, the terminal apparatus may randomly move the first reference object and the enlarging and reducing object.

The speed of enlarging and reducing the enlarging and reducing object may not be a constant speed. For example, the speed may be changed by changing the acceleration of enlarging and reducing.

A game of any genre such as a role playing game, a caring game, a simulation game, a darts game, or a shooting game may be employed as the video game as long as it is configured to display the game image which is the image of the game space including the first reference object and the enlarging and reducing object on the display unit.

Second Embodiment

Figure 6:
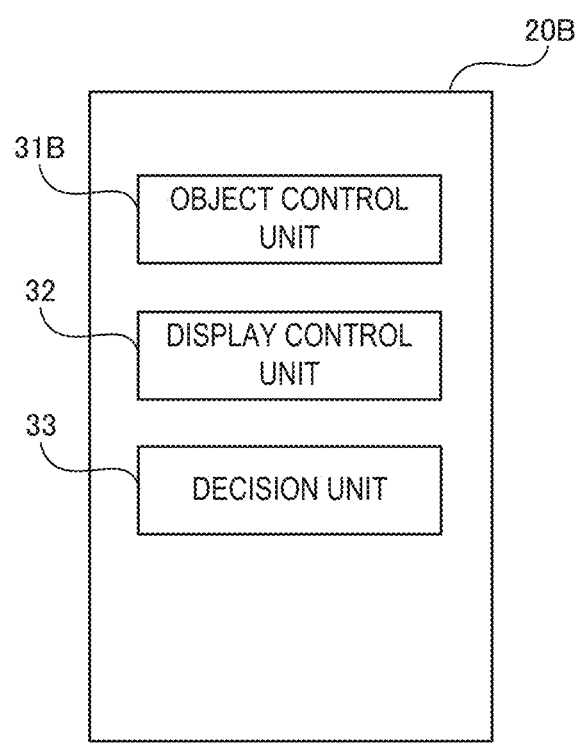
FIG. 6 is a block diagram illustrating an example of a configuration of the terminal apparatus corresponding to at least one embodiment of the present invention.

FIG. 6 is a block diagram illustrating a configuration of a terminal apparatus 20B that is an example of the terminal apparatus 20. In the present example, the terminal apparatus 20B includes at least an object control unit 31B, the display control unit 32, and the decision unit 33.

The object control unit 31B controls the operation of the first reference object and the enlarging and reducing object. For example, the arrangement positions of the first reference object and the enlarging and reducing object are controlled. In addition, for example, an operation of enlarging and reducing the enlarging and reducing object is controlled. The object control unit 31B of the example of the present embodiment changes the acceleration or the speed of enlarging and reducing the enlarging and reducing object randomly or under a predetermined rule.

An example of changing under the predetermined rule is a configuration of changing the acceleration (or the speed) between the time of enlarging and the time of reducing the enlarging and reducing object. In addition, for example, a configuration of changing the acceleration (or the speed) between the first half and the second half of a period from the start of enlarging to the end of enlarging may be available. In this case, the acceleration may be set such that the speed is gradually increased in the first half, and the acceleration may be set such that the speed is gradually decreased in the second half. In this case, the same may be applied to the time of reducing. The value of the acceleration (or the speed) to be set may be included in the game data.

An example of random changing is a configuration of randomly changing the acceleration (or the speed) at the time of enlarging and reducing each time a predetermined period elapses.

The display control unit 32 displays the game image of the game space including the first reference object and the enlarging and reducing object on the display unit. The image data of the first reference object, the enlarging and reducing object, and the like may be included in the game data. The decision unit 33, in a case where the decision operation is performed by the user, decides the arrival location of the moving object released from the predetermined position in the game space based on the state of the enlarging and reducing object. In the case of a state where the enlarging and reducing object is contained in the first reference object, the decision unit 33 decides a position in the game space included in the display region of the first reference object in the game image as the arrival location.

Next, the operation of the game system 100 (system 100) of this embodiment will be described.

Figure 7:
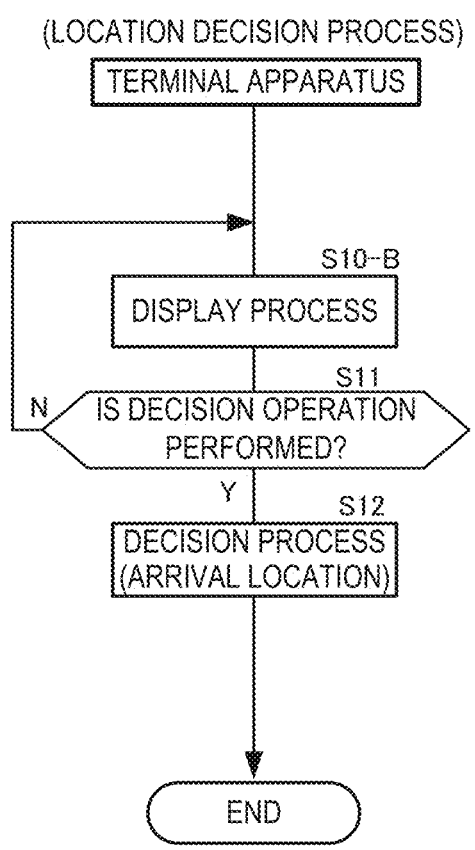
FIG. 7 is a flowchart illustrating an example of the location decision process corresponding to at least one embodiment of the present invention.

FIG. 7 is a flowchart illustrating an example of a location decision process executed by the system 100. In the location decision process, a process for deciding the arrival location of the moving object is performed. Hereinafter, a case where the terminal apparatus 20B executes the location decision process will be illustratively described. A flowchart illustrating the operation of the server apparatus will not be described from the viewpoint of avoiding duplicate description.

For example, the location decision process of the example of the present embodiment is executed by using a state where the moving object can be shot by an operation of the user as a trigger.

In the location decision process, the terminal apparatus 20B performs a display process (step S10-B). In the display process, the game image of the game space including the first reference object and the enlarging and reducing object is displayed on the display unit. The terminal apparatus 20B repeatedly executes the display process in step S10-B until the decision operation is performed (step S11: YES). That is, an operation of repeatedly enlarging and reducing the enlarging and reducing object as described above is displayed on the display unit until the decision operation is performed. In the example of the present embodiment, an operation of repeatedly enlarging and reducing the enlarging and reducing object is displayed in the configuration of changing the acceleration or the speed of enlarging and reducing randomly or under the predetermined rule. The decision operation may be performed by operating the operation unit.

In a case where the decision operation is performed (step S11: YES), the terminal apparatus 20B executes a decision process (step S12). In the decision process, the arrival location is decided based on the state of the enlarging and reducing object in a case where the decision operation is performed. Then, the terminal apparatus 20B finishes the location decision process. Finally, the terminal apparatus 20B performs a process of releasing the moving object toward the decided arrival location.

As one aspect of the second embodiment described above, the terminal apparatus 20B is configured to include the object control unit 31B, the display control unit 32, and the decision unit 33. Thus, depending on the timing of the decision operation, the user may not hit a part at which the moving object is aimed even in a case where aim is appropriately set. Accordingly, the user needs to consider the timing of the decision operation in order for the moving object to hit, and interest as a game is improved.

Since it is configured to change the acceleration or the speed of enlarging and reducing the enlarging and reducing object randomly or under the predetermined rule, the rhythm of enlarging and reducing is changed, and the user does not easily acquire the timing of performing the decision operation. Thus, difficulty is increased. Accordingly, interest as a game is further improved.

Third Embodiment

Figure 8:
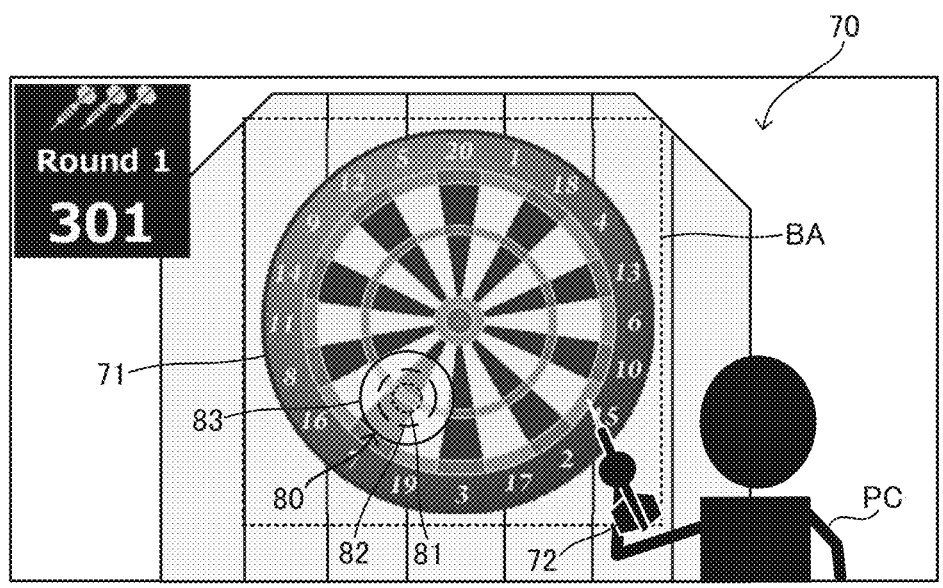
FIG. 8 is a diagram illustrating one example of a game image during execution of a virtual darts game corresponding to at least one embodiment of the present invention.

FIG. 8 is a diagram illustrating one example of a game image displayed on the display unit (display screen) of a terminal apparatus 20C that is an example of the terminal apparatus 20 of the example of the present embodiment. The terminal apparatus 20C provides the game to the user by displaying the game image on the display unit as illustrated in FIG. 8 by executing an application program (game program) stored in the storage unit. The game of the example of the present embodiment progresses such that a player character PC of the user defeats an enemy character in a game space 70 that is a three-dimensional virtual space. The user (player character PC) can play a minigame (darts game) at a predetermined part of the game space 70.

The darts game is started by the user performing a starting operation for the darts game using the operation unit of the terminal apparatus 20C in a state where the player character PC is moved to the predetermined part of the game space 70. FIG. 8 is a diagram illustrating one example of the game image during execution of the darts game. The darts game of the example of the present embodiment is implementation of a general darts game in the game space 70.

In the example of the present embodiment, "zero one (01)" is applied as a rule. Specifically, with the number of throws in one round: 3, one game is set with three rounds and is cleared in a case where a set number (points) becomes zero. The points are set to 301, 501, or the like. In the darts game, the user is required to decide an aimed location, set aim, and accurately throw a dart 72.

As illustrated in FIG. 8, during execution of the darts game, the image of the game space 70 in a state where a part of the player character PC is included and in which a dartboard 71 arranged on a wall is centered is displayed on the display unit as the game image. An image of an aiming cursor 80 is overlaid on the image of the game space 70 in the game image.

The aiming cursor 80 is used for specifying a position (target) desired to be hit with the dart 72 by the user in the darts game. The aiming cursor 80 is moved on the game image based on the moving operation performed by the user using the operation unit. Specifically, the aiming cursor 80 can be moved within a moving range BA including the dartboard 71. The user moves the center of the aiming cursor 80 to the position (target) desired to be hit with the dart 72 by performing the moving operation. Next, the user causes the player character PC to release the dart 72 by performing a throwing operation (decision operation) using the operation unit. The moving range BA is not displayed on the actual game image.

The aiming cursor 80 is configured with a first reference cursor 81, a second reference cursor 82, a target cursor 83, and the like. The first reference cursor 81, the second reference cursor 82, and the target cursor 83 are objects that have an annular shape and are concentrically arranged. That is, the first reference cursor 81, the second reference cursor 82, and the target cursor 83 have similar shapes. The first reference cursor 81 has a smaller diameter than the second reference cursor 82 and is in a state of being contained in the second reference cursor 82. The shapes of the first reference cursor 81 and the second reference cursor 82 are not changed, and the target cursor 83 is enlarged and reduced.

Figure 9A:
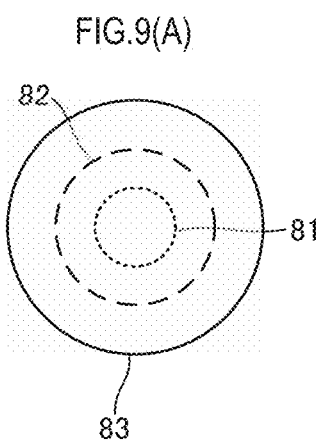
FIGS. 9A to 9C are descriptive diagrams illustrating one example of a first reference cursor, a second reference cursor, and a target cursor corresponding to at least one embodiment of the present invention.
Figure 9B:
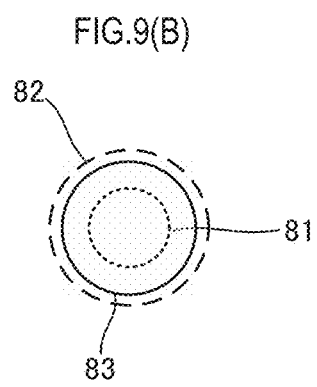
Figure 9C:
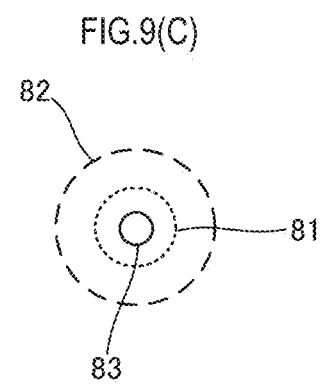

The target cursor 83 is enlarged and reduced from a state of containing the first reference cursor 81 and the second reference cursor 82 to a state of being contained in the first reference cursor 81 and the second reference cursor 82. Specifically, the target cursor 83 is gradually reduced from the state of containing the first reference cursor 81 and the second reference cursor 82 illustrated in FIG. 9A to a state of containing only the first reference cursor 81 illustrated in FIG. 9B and further to the state of being contained in the first reference cursor 81 and the second reference cursor 82 as illustrated in FIG. 9C. Then, the target cursor 83 is gradually enlarged from the state illustrated in FIG. 9C to the state illustrated in FIG. 9B and further to the state illustrated in FIG. 9A. The target cursor 83 is repeatedly enlarged and reduced until the throwing operation (decision operation) is performed. FIG. 9A to FIG. 9C are diagrams illustrating one example of the first reference cursor 81, the second reference cursor 82, and the target cursor 83.

The speed of enlarging and reducing the target cursor 83 is not a constant speed and, for example, is gradually increased along with reducing and gradually decreased along with enlarging. Specifically, an acceleration $\alpha 1$ ($\alpha 1 > 0$) for reducing and an acceleration $\alpha 2$ ($\alpha 2 < 0$) for enlarging are set in the game data. For the target cursor 83, the speed at the start of reducing=0 is established, and the speed is gradually increased in accordance with the acceleration $\alpha 1$ until the end of reducing. In addition, for the target cursor 83, the speed at the start of enlarging=the speed at the end of reducing is established, and the speed is gradually decreased in accordance with the predetermined acceleration α2 until the end of enlarging.

The first reference cursor 81 corresponds to the first reference object, and the second reference cursor 82 corresponds to the second reference object. The target cursor 83 corresponds to the enlarging and reducing object. The dart 72 corresponds to the moving object.

Figure 10A:
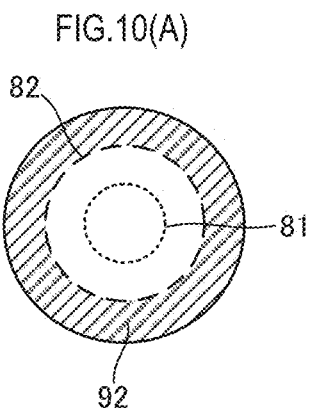
FIGS. 10A to 10C are descriptive diagrams illustrating a relationship between the target cursor and an arrival location corresponding to at least one embodiment of the present invention.
Figure 10B:
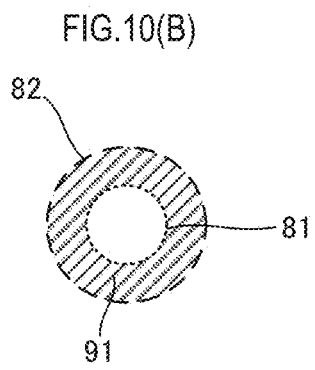
Figure 10C:
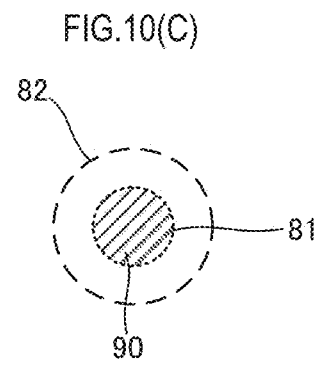

Next, decision of the arrival location (hit position) of the dart 72 will be described with reference to FIG. 10A to FIG. 10C. FIG. 10A to FIG. 10C are descriptive diagrams illustrating a relationship between the target cursor 83 and the arrival location.

The arrival location of the released dart 72 is decided based on the state of the target cursor 83 in a case where the throwing operation (decision operation) is performed. For example, in a case where the throwing operation is performed by the user and the target cursor 83 is in the state of being contained in the first reference cursor 81 and the second reference cursor 82 as illustrated in FIG. 9C, a position in the game space 70 included in an arrival region 90 is decided as the arrival location as illustrated in FIG. 10C. The arrival region 90 is the display region of the first reference cursor 81. In the example of the present embodiment, the terminal apparatus 20C randomly selects one position (positional coordinates of a screen coordinate system) in the arrival region 90 and decides a position in the game space 70 corresponding to the selected position as the arrival location. That is, a position in the game space 70 overlapping with the selected position in the game image is set as the arrival location.

Figure 11:
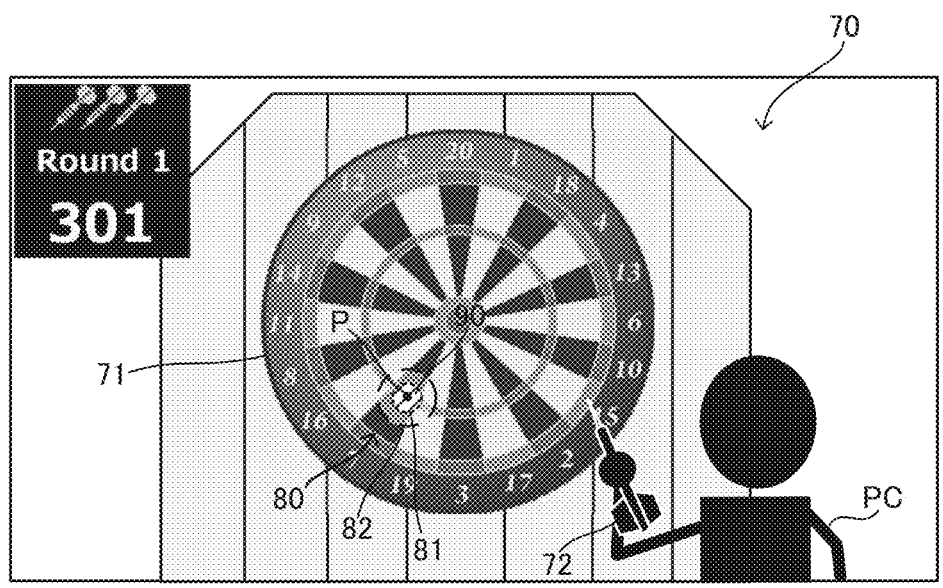
FIG. 11 is a diagram illustrating one example of the game image during execution of the virtual darts game corresponding to at least one embodiment of the present invention.

For example, a case where the throwing operation is performed in a state where the aiming cursor 80 is at a position overlapping with the dartboard 71 as illustrated in FIG. 11 will be described. In this case, the dart 72 arrives (hits) in a region "triple" of a number "7" of the dartboard 71 that overlaps with one position P randomly selected in the arrival region 90.

In the example of the present embodiment, in a case where the target cursor 83 is in the state of having the same shape as the first reference cursor 81 and overlapping with the first reference cursor 81 in the game image, it is determined that the target cursor 83 is in the state of being contained in the first reference cursor 81 and the second reference cursor 82.

Next, for example, in a case where the throwing operation is performed by the user and the target cursor 83 is in the state of containing only the first reference cursor 81 as illustrated in FIG. 9B, a position in the game space 70 included in an arrival region 91 is decided as the arrival location as illustrated in FIG. 10B. The arrival region 91 is the display region of the second reference cursor 82 excluding the display region (arrival region 90) of the first reference cursor 81. In the example of the present embodiment, the terminal apparatus 20C randomly selects one position (positional coordinates of a screen coordinate system) in the arrival region 91 in the same manner as the case of the arrival region 90 and decides a position in the game space 70 corresponding to the selected position as the arrival location.

In the example of the present embodiment, in a case where the target cursor 83 is in the state of having the same shape as the second reference cursor 82 and overlapping with the second reference cursor 82 in the game image, it is determined that the target cursor 83 is in the state of containing only the first reference cursor 81.

Next, for example, in a case where the throwing operation is performed by the user and the target cursor 83 is in the state of containing the first reference cursor 81 and the second reference cursor 82 as illustrated in FIG. 9A, a position in the game space 70 included in an arrival region 92 is decided as the arrival location as illustrated in FIG. 10A. The arrival region 92 is a region around the second reference cursor 82. That is, the arrival region 92 does not include the arrival regions 90 and 91. In the example of the present embodiment, the terminal apparatus 20C randomly selects one position (positional coordinates of a screen coordinate system) in the arrival region 92 in the same manner as the case of the arrival regions 90 and 91 and decides a position in the game space 70 corresponding to the selected position as the arrival location. In the case of the state illustrated in FIG. 9A, the arrival region 92 may not be set, and the dart 72 may not hit any part of the dartboard 71 as a throwing failure.

As described above, the arrival location of the released dart 72 is decided from the arrival regions 90 to 92 based on the state of the target cursor 83 in a case where the throwing operation (decision operation) is performed. The possibility of hitting a position aimed by the user is the highest in the arrival region 90. Meanwhile, the possibility of hitting the position aimed by the user is the lowest in the arrival region 92. Accordingly, in order to hit the aimed position, the user sets the center of the aiming cursor 80 to the aimed position and performs the throwing operation by aiming a state where the target cursor 83 is contained in the first reference cursor 81.

While one position is randomly selected in the arrival regions 90 to 92, any selection method can be employed. Any size and any shape included in the display region of at least the first reference cursor 81 can be employed as the arrival region 90. For example, a circular region having a smaller diameter than the first reference cursor 81 may be set as the arrival region 90. In addition, any size and any shape included in the display region of at least the second reference cursor 82 excluding the display region of the first reference cursor 81 (arrival region 90) can be employed as the arrival region 91. Furthermore, any size and any shape of a region around at least the second reference cursor 82 can be employed as the arrival region 92.

A position in the game space 70 included in the display region (arrival regions 90 to 92) is specified using a general configuration. Thus, such a configuration will not be described in detail.

Next, an initial position at which display of the aiming cursor 80 is started will be described. While the aiming cursor 80 is displayed by starting execution of the darts game, the initial position at which display is started is randomly decided by the terminal apparatus 20C. Specifically, the initial position is randomly decided as any position (positional coordinates of the screen coordinate system) within the moving range BA. For example, the center position of the aiming cursor 80 is randomly decided. Each time the dart 72 is thrown (released), the terminal apparatus 20C randomly decides the initial position and restores the position of the aiming cursor 80 to the initial position. That is, the position at which display of the aiming cursor 80 is started varies each time throwing is performed. Thus, the user is required to perform a different moving operation for the aiming cursor 80 every time. The initial position may always be the same position.

Figure 12:
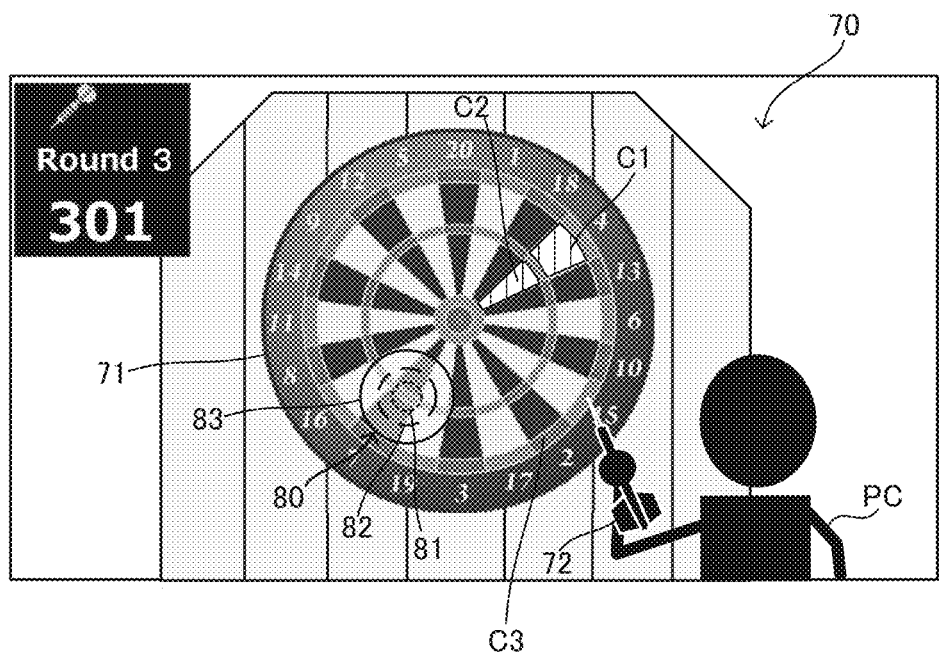
FIG. 12 is a diagram illustrating one example of the game image during execution of the virtual darts game corresponding to at least one embodiment of the present invention.

Next, a reach effect in the darts game will be described with reference to FIG. 12. FIG. 12 is a diagram illustrating one example of the game image during execution of the darts game.

In the reach effect, a position (scoring region) in the dartboard at which the darts game is cleared in one turn (one throwing) is displayed in a highlighted manner. For example, in a case where the remaining points of the user (player character PC) are four points, scoring regions C1 and C2 of four points in the dartboard 71 are displayed in a highlighted manner as illustrated in FIG. 12. The reach effect is executed in a case where the darts game can be cleared in one turn (one throwing).

In displaying in a highlighted manner, for example, the color of the corresponding scoring region is set to a color different from a usual color. Specifically, texture used in the corresponding scoring region is changed to texture for displaying in a highlighted manner. Alternatively, another image may be overlaid on the image of the corresponding scoring region.

In a case where a plurality of types of scoring regions for clearing the darts game are present in the dartboard, a position for which difficulty is low may be displayed in a highlighted manner. For example, in a case where the remaining points of the user (player character PC) are four points, a scoring region C3 (region "double" of a number "2") of 2 points×2=4 points is also present but has higher difficulty than the regions C1 and C2. Thus, the scoring region C3 is not displayed in a highlighted manner. Difficulty data that is associated with each scoring region of the dartboard 71 may be referred to for difficulty. The difficulty data may be included in the game data.

Figure 13:
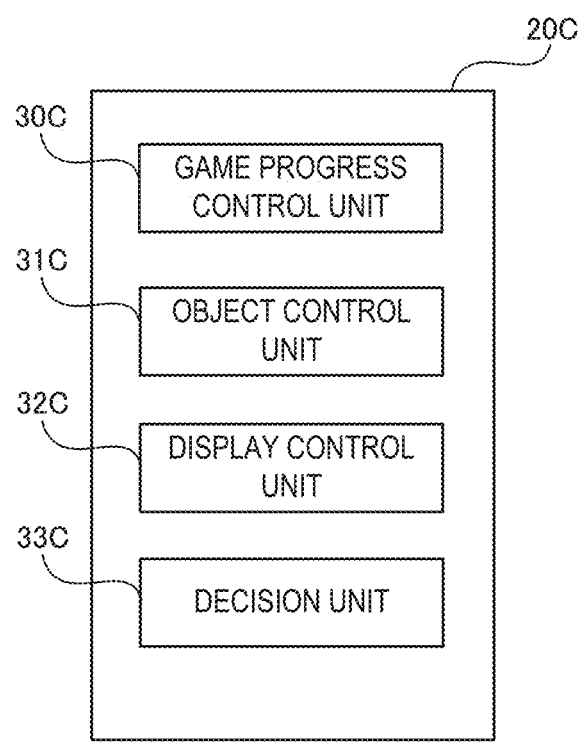
FIG. 13 is a block diagram illustrating an example of the configuration of the terminal apparatus corresponding to at least one embodiment of the present invention.

FIG. 13 is a block diagram illustrating a configuration of the terminal apparatus 20C which is an example of the terminal apparatus 20. In the present example, the terminal apparatus 20C includes at least a game progress control unit 30C, an object control unit 31C, a display control unit 32C, and a decision unit 33C.

The game progress control unit 30C controls the progress of the darts game in the game space 70 based on the game rule (rule: zero one). The game progress control unit 30C allows the user to play the darts game in which the number of throws in one round: 3 is established and one game (one play) is set with total three rounds as described above. The game progress control unit 30C subtracts the scores of the scoring region hit by the dart 72 in the dartboard 71 from the points of the user each time throwing is performed in three rounds. Whether or not the game is cleared is determined depending on whether or not the points reach zero until the end of three rounds.

For example, the game progress control unit 30C may perform a process of subtracting the points by referring to scoring data in which each scoring region of the dartboard 71 is associated with scoring information. The scoring data may be included in the game data.

In a case where it is determined that the points cannot become zero until the end of three rounds, the game progress control unit 30C finishes the game without finishing three rounds. For example, such a case corresponds to a case where the points reach a negative value.

The game progress control unit 30C performs the reach effect based on the current points of the user, the scoring data, the difficulty data, and the like.

The object control unit 31C controls the operation of the aiming cursor 80. For example, the arrangement positions (including the initial positions) of the first reference cursor 81, the second reference cursor 82, and the target cursor 83 are controlled. In addition, for example, the object control unit 31C controls an operation of enlarging and reducing the target cursor 83. The speed of enlarging and reducing is controlled based on the accelerations α1 and α2 as described above.

The object control unit 31C controls the operation of the player character PC and the dart 72. In a case where the throwing operation is performed as described above, the dart 72 held in a hand is released toward the decided arrival location by operating the player character PC.

The display control unit 32C displays the game image of the game space 70 including the aiming cursor 80 on the display unit. Image data of the aiming cursor 80 and the like may be included in the game data.

The decision unit 33C, in a case where the throwing operation (decision operation) is performed by the user, decides the arrival location of the dart 72, which is released from the hand (predetermined position) of the player character PC, on the dartboard 71 based on the state of the target cursor 83. As described using FIG. 9A to FIG. 9C and the like, the decision unit 33C selects one arrival region from the arrival regions 90 to 92 based on a positional relationship between the target cursor 83 at the time of the throwing operation and the first reference cursor 81 and the second reference cursor 82. The decision unit 33C randomly selects one position (positional coordinates of the screen coordinate system) in the selected arrival region and decides a position in the game space 70 corresponding to the selected position as the arrival location.

Next, the operation of the game system 100 (system 100) of this embodiment will be described.

Figure 14:
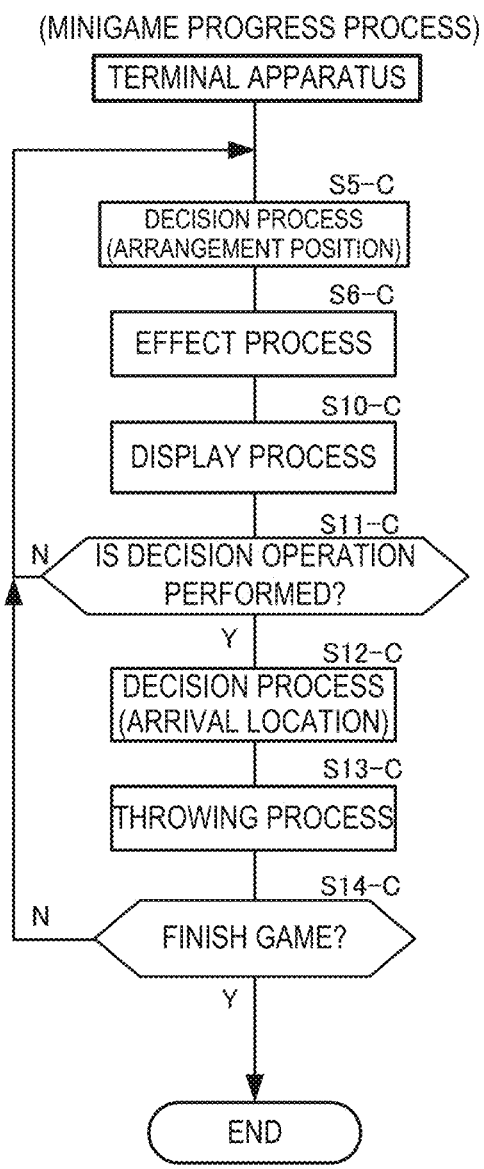
FIG. 14 is a flowchart illustrating an example of a game progress process corresponding to at least one embodiment of the present invention.

FIG. 14 is a flowchart illustrating an example of a minigame progress process executed by the system 100. In the minigame progress process, a process for the progress of the darts game is performed. The minigame progress process includes the location decision process. In the location decision process, a process for deciding the arrival location of the dart 72 is performed. Hereinafter, a case where the terminal apparatus 20C executes the minigame progress process will be illustratively described. A flowchart illustrating the operation of the server apparatus will not be described from the viewpoint of avoiding duplicate description.

For example, the minigame progress process of the example of the present embodiment is executed by using the starting operation performed for the minigame by the user as a trigger. That is, the minigame progress process is executed by using a state where the dart 72 can be shot by the starting operation as a trigger.

In the minigame progress process, the terminal apparatus 20C executes a decision process for an arrangement position of the aiming cursor 80 (step S5-C). Specifically, the arrangement position (positional coordinates of the screen coordinate system) in the image of the game space is decided. When the game is started (when throwing is started), the terminal apparatus 20C sets the randomly selected initial position as the arrangement position as described above. Then, in a case where the moving operation is performed by the user until the throwing operation is performed, the terminal apparatus 20C moves (changes) the arrangement position based on the moving operation.

Next, the terminal apparatus 20C executes an effect process (step S6-C). In the effect process, the reach effect is performed as described using FIG. 12. Specifically, a position (scoring region) in the dartboard at which the darts game is cleared in one turn (one throwing) is specified.

Next, the terminal apparatus 20C performs a display process (step S10-C). In the display process, the game image of the game space 70 including the aiming cursor 80 is displayed on the display unit as illustrated in FIG. 8. The aiming cursor 80 is in the state of being arranged at the arrangement position decided in step S5-C. In a case where the reach effect is performed, the specified position in the dartboard at which the darts game is cleared is displayed in a highlighted manner in the game image.

The terminal apparatus 20C repeatedly executes the processes of steps S5-C to S10-C until the throwing operation (decision operation) is performed (step S11-C: YES). That is, an operation of repeatedly enlarging and reducing the target cursor 83 as described above is displayed until the decision operation is performed. In addition, the aiming cursor 80 is displayed as moving based on the moving operation until the decision operation is performed.

In a case where the decision operation is performed (step S11-C: YES), the terminal apparatus 20C executes a decision process (step S12-C). In the decision process, as described using FIG. 9A to FIG. 9C and the like, the arrival location is decided based on the state of the target cursor 83 in a case where the decision operation is performed.

Next, the terminal apparatus 20C executes a throwing process (step S13-C). In the throwing process, the player character PC is caused to perform an operation of throwing (releasing) the dart 72, and operation of the dart 72 is controlled such that the dart 72 arrives at the decided arrival location. The state of the thrown dart 72 in the game space 70 is displayed on the display unit. In addition, in the throwing process, the current number of rounds, the points of the user, and the like in the darts game are updated.

Then, the terminal apparatus 20C determines whether or not to finish the game (step S14-C). For example, in a case where three rounds are finished or the darts game cannot be cleared with the points, the terminal apparatus 20C may determine to finish the game. In the case of not finishing the game (step S14-C: NO), the terminal apparatus 20C returns to the process of step S5-C. In this case, since a state where one dart 72 is thrown is set, the initial position is used as the arrangement position of the aiming cursor 80 in the process of step S5-C. Meanwhile, in the case of finishing the game (step S14-C: YES), the terminal apparatus 20C finishes the minigame progress process.

As one aspect of the third embodiment described above, the terminal apparatus 20C is configured to include the game progress control unit 30C, the object control unit 31C, the display control unit 32C, and the decision unit 33C. Thus, depending on the timing of the decision operation, the user may not hit a part at which the moving object (target cursor) is aimed even in a case where aim is appropriately set. Accordingly, the user needs to consider the timing of the decision operation while setting aim in order for the moving object to hit, and interest as a game is improved.

Since it is configured to change the speed of the enlarging and reducing object (target cursor), the rhythm of enlarging and reducing is changed, and the user does not easily acquire the timing of performing the decision operation. Thus, difficulty is increased. Accordingly, interest as a game is further improved.

While the speed of enlarging and reducing the target cursor is controlled using the accelerations α1 and α2 in the examples of the embodiments, any configuration that is a configuration of changing the acceleration or the speed of enlarging and reducing the enlarging and reducing object randomly or under the predetermined rule can be employed. The speed of enlarging and reducing may be a constant speed.

While the first reference cursor (first reference object), the second reference cursor (second reference object), and the target cursor (enlarging and reducing object) are overlaid on the image of the game space and displayed as the game image in the example of the present embodiment, the present invention is not particularly limited to the example. For example, each object may be arranged in the game space which is a three-dimensional virtual space. In this case, arrangement of each object and a virtual camera may be controlled such that a state where the target cursor is enlarged and reduced as illustrated in FIG. 9A to FIG. 9C can be visually recognized in the game image.

The first reference cursor (first reference object), the second reference cursor (second reference object), and the target cursor (enlarging and reducing object) have similar annular shapes in the example of the present embodiment, but may not particularly have similar shapes. For example, the first reference cursor and the second reference cursor may be triangular plate-shaped objects, and the enlarging and reducing object may be a circular plate. The first reference cursor, the second reference cursor, and the target cursor may not be concentrically arranged.

While two reference objects including the first reference cursor (first reference object) and the second reference cursor (second reference object) are used in the example of the present embodiment, the present invention is not particularly limited to the example. For example, a configuration of using only one reference object may be available. Alternatively, a configuration of using three or more reference objects may be available.

APPENDIX

The embodiments are described in order for those having ordinary knowledge in the field of the invention to be capable of embodying at least the following invention.

[1]

A game program causing a computer to execute a function of controlling progress of a video game based on an operation input of a user, the game program causing the computer to implement a first control function of controlling operation of a first reference object having a predetermined shape and an enlarging and reducing object that is repeatedly enlarged and reduced between a state of being contained in the first reference object and a state of containing the first reference object, a second control function of displaying a game image that is an image of a game space including the first reference object and the enlarging and reducing object on a display unit, and a decision function of deciding an arrival location of a moving object released from a predetermined position in the game space based on a state of the enlarging and reducing object in a case where a decision operation is performed by the user, in which in the decision function, a function of deciding, as the arrival location, a position in the game space included in a display region of the first reference object in the game image in a case where the enlarging and reducing object is in the state of being contained in the first reference object is implemented.

[2]

The game program according to [1], in which in the first control function, a function of changing an acceleration or a speed of enlarging and reducing the enlarging and reducing object randomly or under a predetermined rule is implemented.

[3]

The game program according to [1], in which in the decision function, a function of deciding, as the arrival location, a position in the game space in a region around the display region of the first reference object in the game image in a case where the enlarging and reducing object is in the state of containing the first reference object is implemented.

[4]

The game program according to [1], in which in the decision function, a function of deciding, as the arrival location, a position in the game space corresponding to a position randomly selected in the display region of the first reference object is implemented.

[5]

The game program according to [1], in which in the first control function, a function of moving positions of the first reference object and the enlarging and reducing object on the game image based on a moving operation performed by the user is implemented.

[6]

The game program according to [5], in which in the first control function, a function of restoring the first reference object and the enlarging and reducing object to a randomly decided initial position each time the moving object is released is implemented.

[7]

The game program according to [1], in which in the first control function, a function of controlling operation of a second reference object that contains the first reference object and has a shape similar to the first reference object, and a function of repeatedly enlarging and reducing the enlarging and reducing object between the state of being contained in the first reference object and a state of containing the first reference object and the second reference object are implemented, in the second control function, a function of displaying a game image that is an image of a game space including the first reference object, the second reference object, and the enlarging and reducing object on a display unit is implemented, and in the decision function, a function of deciding, as the arrival location, a position in a game space included in a display region of the second reference object excluding the display region of the first reference object in the game image in a case of a state where the enlarging and reducing object is contained in the second reference object and contains the first reference object is implemented.

[8]

The game program according to [7], in which the first reference object, the second reference object, and the enlarging and reducing object have concentric annular shapes.

[9]

A server apparatus on which the game program according to [1] is installed.

[10]

A terminal program causing a game terminal apparatus to implement a function of executing a video game by displaying a game image on a display unit, the terminal program causing the terminal apparatus to implement a connection function of connecting to the server apparatus according to [9] through a communication network.

[11]

A game terminal apparatus on which the game program according to [1] is installed.

[12]

A game program causing a server apparatus to control progress of a video game, the server apparatus being connected to a game terminal apparatus executing the video game based on an operation input of a user through a communication network, the game program causing the server apparatus to implement a first control function of controlling operation of a first reference object having a predetermined shape and an enlarging and reducing object that is repeatedly enlarged and reduced between a state of being contained in the first reference object and a state of containing the first reference object, a second control function of displaying a game image that is an image of a game space including the first reference object and the enlarging and reducing object on a display unit, and a decision function of deciding an arrival location of a moving object released from a predetermined position in the game space based on a state of the enlarging and reducing object in a case where a decision operation is performed by the user, in which in the decision function, a function of deciding, as the arrival location, a position in the game space included in a display region of the first reference object in the game image in a case where the enlarging and reducing object is in the state of being contained in the first reference object is implemented.

[13]

The game program according to [12], in which in the first control function, a function of changing an acceleration or a speed of enlarging and reducing the enlarging and reducing object randomly or under a predetermined rule is implemented.

[14]

The game program according to [12], in which in the decision function, a function of deciding, as the arrival location, a position in the game space in a region around the display region of the first reference object in the game image in a case where the enlarging and reducing object is in the state of containing the first reference object is implemented.

[15]

The game program according to [12], in which in the decision function, a function of deciding, as the arrival location, a position in the game space corresponding to a position randomly selected in the display region of the first reference object is implemented.

[16]

The game program according to [12], in which in the first control function, a function of moving positions of the first reference object and the enlarging and reducing object on the game image based on a moving operation performed by the user is implemented.

[17]

The game program according to [16], in which in the first control function, a function of restoring the first reference object and the enlarging and reducing object to a randomly decided initial position each time the moving object is released is implemented.

[18]

The game program according to [12], in which in the first control function, a function of controlling operation of a second reference object that contains the first reference object and has a shape similar to the first reference object, and a function of repeatedly enlarging and reducing the enlarging and reducing object between the state of being contained in the first reference object and a state of containing the first reference object and the second reference object are implemented, in the second control function, a function of displaying a game image that is an image of a game space including the first reference object, the second reference object, and the enlarging and reducing object on a display unit is implemented, and in the decision function, a function of deciding, as the arrival location, a position in a game space included in a display region of the second reference object excluding the display region of the first reference object in the game image in a case of a state where the enlarging and reducing object is contained in the second reference object and contains the first reference object is implemented.

[19]

The game program according to [18], in which the first reference object, the second reference object, and the enlarging and reducing object have concentric annular shapes.

[20]

A game system including a game terminal apparatus executing a video game based on an operation input of a user, and a server apparatus connected to the game terminal apparatus through a communication network, the game system including a first controller configured to control operation of a first reference object having a predetermined shape and an enlarging and reducing object that is repeatedly enlarged and reduced between a state of being contained in the first reference object and a state of containing the first reference object, a second controller configured to display a game image that is an image of a game space including the first reference object and the enlarging and reducing object on a display unit, and a decider configured to decide an arrival location of a moving object released from a predetermined position in the game space based on a state of the enlarging and reducing object in a case where a decision operation is performed by the user, in which the decider decides, as the arrival location, a position in the game space included in a display region of the first reference object in the game image in a case where the enlarging and reducing object is in the state of being contained in the first reference object.

[21]

The game system according to [20], in which the first controller changes an acceleration or a speed of enlarging and reducing the enlarging and reducing object randomly or under a predetermined rule.

[22]

The game system according to [20], in which the decider decides, as the arrival location, a position in the game space in a region around the display region of the first reference object in the game image in a case where the enlarging and reducing object is in the state of containing the first reference object.

[23]

The game system according to [20], in which the decider decides, as the arrival location, a position in the game space corresponding to a position randomly selected in the display region of the first reference object.

[24]

The game system according to [20], in which the first controller moves positions of the first reference object and the enlarging and reducing object on the game image based on a moving operation performed by the user.

[25]

The game system according to [24], in which the first controller restores the first reference object and the enlarging and reducing object to a randomly decided initial position each time the moving object is released.

[26]

The game system according to [20], in which the first controller controls operation of a second reference object that contains the first reference object and has a shape similar to the first reference object, and repeatedly enlarges and reduces the enlarging and reducing object between the state of being contained in the first reference object and a state of containing the first reference object and the second reference object, the second controller displays a game image that is an image of a game space including the first reference object, the second reference object, and the enlarging and reducing object on a display unit, and the decider decides, as the arrival location, a position in a game space included in a display region of the second reference object excluding the display region of the first reference object in the game image in a case of a state where the enlarging and reducing object is contained in the second reference object and contains the first reference object.

[27]

The game system according to [26], in which the first reference object, the second reference object, and the enlarging and reducing object have concentric annular shapes.

[28]

A game terminal apparatus causing a computer to execute a function of controlling progress of a video game based on an operation input of a user, the game terminal apparatus including a first controller configured to control operation of a first reference object having a predetermined shape and an enlarging and reducing object that is repeatedly enlarged and reduced between a state of being contained in the first reference object and a state of containing the first reference object, a second controller configured to display a game image that is an image of a game space including the first reference object and the enlarging and reducing object on a display unit, and a decider configured to decide an arrival location of a moving object released from a predetermined position in the game space based on a state of the enlarging and reducing object in a case where a decision operation is performed by the user, in which the decider decides, as the arrival location, a position in the game space included in a display region of the first reference object in the game image in a case where the enlarging and reducing object is in the state of being contained in the first reference object.

[29]

A game progress control method of, by a computer, controlling progress of a video game based on an operation input of a user, the game progress control method including a first control process of controlling operation of a first reference object having a predetermined shape and an enlarging and reducing object that is repeatedly enlarged and reduced between a state of being contained in the first reference object and a state of containing the first reference object, a second control process of displaying a game image that is an image of a game space including the first reference object and the enlarging and reducing object on a display unit, and a decision process of deciding an arrival location of a moving object released from a predetermined position in the game space based on a state of the enlarging and reducing object in a case where a decision operation is performed by the user, in which in the decision process, a position in the game space included in a display region of the first reference object in the game image in a case where the enlarging and reducing object is in the state of being contained in the first reference object is decided as the arrival location.

One embodiment of the present invention is useful for improving interest as a game in a game in which aim is set using an aiming cursor or the like.

What is claimed is:

1. A non-transitory computer-readable medium including a game program causing a computer to execute functions of controlling progress of a video game based on an operation input of a user, the functions comprising:
    a first control function of controlling operation of a first reference object having a predetermined shape and an enlarging and reducing object that is repeatedly enlarged and reduced between a state of containing the first reference object and a state of being contained in the first reference object, wherein the first control function includes:
        a function of controlling operation of a second reference object that contains the first reference object and has a shape similar to the first reference object; and
        a function of repeatedly enlarging and reducing the enlarging and reducing object between the state of being contained in the first reference object and a state of containing the first reference object and the second reference object;
    a second control function of displaying a game image that is an image of a game space including the first reference object and the enlarging and reducing object on a display unit, wherein the second control function includes a function of displaying a game image that is an image of a game space including the first reference object, the second reference object, and the enlarging and reducing object on the display unit; and
    a decision function of deciding an arrival location of a moving object released from a predetermined position in the game space based on a state of the enlarging and reducing object in a case where a decision operation is performed by the user,
    wherein the decision function includes a function of deciding, as the arrival location, a position in the game space included in a display region of the first reference object in the game image if the enlarging and reducing object is in the state of being contained in the first reference object, and
    wherein the decision function includes a function of deciding, as the arrival location a position in a game space included in a display region of the second reference object excluding the display region of the first reference object in the game image in a case of a state where the enlarging and reducing object is contained in the second reference object and contains the first reference object.

2. The non-transitory computer-readable medium according to claim 1,
    wherein the first control function includes a function of changing an acceleration or a speed of enlarging and reducing the enlarging and reducing object randomly or under a predetermined rule.

3. The non-transitory computer-readable medium according to claim 1,
    wherein the decision function includes a function of deciding, as the arrival location, a position in the game space in a region around the display region of the first reference object in the game image if the enlarging and reducing object is in the state of containing the first reference object.

4. The non-transitory computer-readable medium according to claim 1,
    wherein the decision function includes a function of deciding, as the arrival location, a position in the game space corresponding to a position randomly selected in the display region of the first reference object.

5. The non-transitory computer-readable medium according to claim 1,
    wherein the first control function includes a function of moving positions of the first reference object and the enlarging and reducing object on the game image based on a moving operation performed by the user.

6. The non-transitory computer-readable medium according to claim 1,
    wherein the first control function includes a function of restoring the first reference object and the enlarging and reducing object to a randomly decided initial position each time the moving object is released.

7. The non-transitory computer-readable medium according to claim 1,
    wherein the first reference object, the second reference object, and the enlarging and reducing object have concentric annular shapes.

8. A non-transitory computer-readable medium including a game program causing a server apparatus to control progress of a video game, the server apparatus being connected to a game terminal apparatus executing the video game based on an operation input of a user through a communication network, the game program causing the server apparatus to execute functions comprising:
    a first control function of controlling operation of a first reference object having a predetermined shape and an enlarging and reducing object that is repeatedly enlarged and reduced between a state of containing in the first reference object and a state of being contained the first reference object, wherein the first control function includes:
        a function of controlling operation of a second reference object that contains the first reference object and has a shape similar to the first reference object; and
        a function of repeatedly enlarging and reducing the enlarging and reducing object between the state of being contained in the first reference object and a state of containing the first reference object and the second reference object;
    a second control function of displaying a game image that is an image of a game space including the first reference object and the enlarging and reducing object on a display unit, wherein the second control function includes a function of displaying a game image that is an image of a game space including the first reference object, the second reference object, and the enlarging and reducing object on the display unit; and a decision function of deciding an arrival location of a moving object released from a predetermined position in the game space based on a state of the enlarging and reducing object in a case where a decision operation is performed by the user, wherein in the decision function, a function of deciding, as the arrival location, a position in the game space included in a display region of the first reference object in the game image if the enlarging and reducing object is in the state of being contained in the first reference object is implemented, and wherein in the decision function, a function of deciding, as the arrival location, a position in a game space included in a display region of the second reference object excluding the display region of the first reference object in the game image in a case of a state where the enlarging and reducing object is contained in the second reference object and contains the first reference object is implemented.

9. A game system including a game terminal apparatus executing a video game based on an operation input of a user, and a server apparatus connected to the game terminal apparatus through a communication network, the game system comprising:

at least one processor; and at least one memory including at least one set of instructions that, when executed by the at least one processor, causes the at least one processor to perform operations including:

controlling operation of a first reference object having a predetermined shape and an enlarging and reducing object that is repeatedly enlarged and reduced between a state of containing the first reference object and a state of being contained in the first reference object;

controlling operation of a second reference object that contains the first reference object and has a shape similar to the first reference object and repeatedly enlarging and reducing the enlarging and reducing object between the state of being contained in the first reference object and a state of containing the first reference object and the second reference object;

displaying a game image that is an image of a game space including the first reference object and the enlarging and reducing object on a display unit;

displaying a game image that is an image of a game space including the first reference object, the second reference object, and the enlarging and reducing object on the display unit; and deciding an arrival location of a moving object released from a predetermined position in the game space based on a state of the enlarging and reducing object in a case where a decision operation is performed by the user, wherein the deciding includes deciding, as the arrival location, a position in the game space included in a display region of the first reference object in the game image if the enlarging and reducing object is in the state of being contained in the first reference object, and wherein the deciding includes deciding, as the arrival location, a position in a game space included in a display region of the second reference object excluding the display region of the first reference object in the game image in a case of a state where the enlarging and reducing object is contained in the second reference object and contains the first reference object.

* * * * *